US009402286B2

(12) United States Patent
Lin et al.

(10) Patent No.: US 9,402,286 B2
(45) Date of Patent: Jul. 26, 2016

(54) CIRCUITS AND METHODS FOR DRIVING A LIGHT SOURCE

(71) Applicant: O2 Micro Inc., Santa Clara, CA (US)

(72) Inventors: Yung Lin Lin, Palo Alto, CA (US); Tiesheng Yan, Chengdu (CN); Ching-Chuan Kuo, Taipei (TW)

(73) Assignee: O2Micro Inc, Satna Clara, CA (US)

( * ) Notice: Subject to any disclaimer, the term of this patent is extended or adjusted under 35 U.S.C. 154(b) by 689 days.

(21) Appl. No.: 13/705,546

(22) Filed: Dec. 5, 2012

(65) Prior Publication Data

US 2014/0152187 A1 Jun. 5, 2014

(51) Int. Cl.
*H05B 37/02* (2006.01)
*H05B 33/08* (2006.01)

(52) U.S. Cl.
CPC ........ *H05B 33/0815* (2013.01); *H05B 33/0845* (2013.01); *Y02B 20/348* (2013.01)

(58) Field of Classification Search
CPC .... H05B 37/02; H05B 39/08; H05B 33/0815; H05B 39/048; H05B 33/0845; H05B 37/0245; H05B 37/0227; H05B 39/041; H05B 39/086
USPC ............ 315/209 R, 224, 225, 226, 239, 276, 315/282, 283, 291, 307, 308, 200 R
See application file for complete search history.

(56) References Cited

U.S. PATENT DOCUMENTS

| 6,072,284 | A  | * | 6/2000 | Lin ............................... 315/307 |
| 7,218,063 | B2 | * | 5/2007 | Konopka et al. ............... 315/291 |
| 8,072,158 | B2 | * | 12/2011 | Nerone ......................... 315/294 |
| 8,803,436 | B2 | * | 8/2014 | Newman et al. ............... 315/246 |
| 2008/0024074 | A1 | * | 1/2008 | Mosebrook et al. .......... 315/291 |
| 2009/0108765 | A1 | * | 4/2009 | Weightman et al. .......... 315/224 |
| 2011/0133662 | A1 | * | 6/2011 | Yan et al. ...................... 315/224 |

* cited by examiner

*Primary Examiner* — Don Le (57) ABSTRACT

A circuit includes a bridge circuit, a converter, and a controller. The bridge circuit receives power from first and second power lines of a switch and generates a rectified voltage. The switch is capable of operating in a first state in which the switch conducts power to the first power line but not the second power line, a second state in which the switch conducts power to the second power line but not the first power line, and a third state in which the switch conducts power to both the first and second power lines. The converter converts the rectified voltage to an output voltage to drive a light source, and controls a current through the light source according to a driving signal. The controller monitors the operation state of the switch and generates the driving signal based on the operation state to control brightness/dimming of the light source.

24 Claims, 10 Drawing Sheets

FIG. 9 the description proceeds, and upon reference to the drawings, wherein like numerals depict like parts, and in which:

CIRCUITS AND METHODS FOR DRIVING A LIGHT SOURCE

BACKGROUND

A traditional light source such as an incandescent light bulb generates light by using an electrical current to heat up metal filaments to a relatively high temperature. A three-way lamp has two filaments designed to produce different amounts of light. The three-way lamp is coupled to a three-way switch which activates the two filaments individually or together. As such, the three-way lamp is capable of producing light with three different brightness levels.

Figure 1:
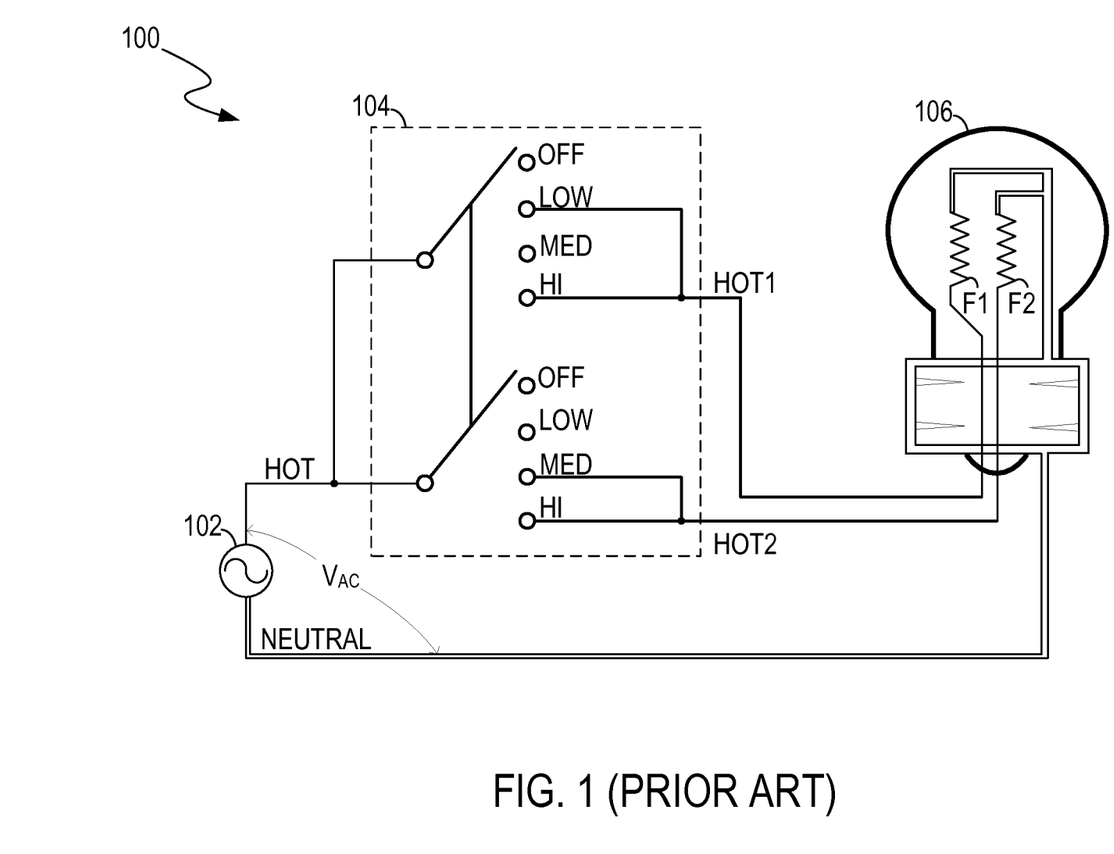
FIG. 1 shows a diagram of a conventional driving circuit.

FIG. 1 shows a diagram of a conventional driving circuit 100. The driving circuit 100 includes a power source 102, a three-way switch 104, and a three-way lamp 106. The power source 102 provides a power voltage $V_{AC}$ between a line HOT and a line NEUTRAL. The three-way switch 104 receives the power voltage $V_{AC}$ and selectively conducts power to the line HOT1 and the line HOT2. The three-way lamp 106 includes a low-wattage filament F1 and a medium-wattage filament F2 coupled to the lines HOT1 and HOT2, respectively. Compared to the filament F2, the filament F1 is capable of emitting light having a lower brightness level.

The three-way switch 104 has four positions OFF, LOW, MED, and HI. When the three-way switch 104 is switched to the position OFF, neither the line HOT1 nor the line HOT2 conducts power to the lamp 106. Thus, the lamp 106 is turned off. When the three-way switch 104 is switched to the position LOW, the filament F1 is energized to produce light having a first brightness level B1. When the three-way switch 104 is switched to the position MED, the filament F2 is energized to produce light having a second brightness level B2. When the three-way switch 104 is switched to the position HI, the filaments F1 and F2 are both energized to produce light having a third brightness level B3, where B1 is less than B2, which is less than B3. In other words, one or both of the filaments F1 and F2 are activated based on operations of the three-way switch 104 to produce light having different brightness levels.

However, as the incandescent light bulb consumes energy in the form of heat, the driving circuit 100 may not be energy efficient.

SUMMARY

In one embodiment, a circuit includes a bridge circuit, a converter, and a controller. The bridge circuit receives power from first and second power lines of a switch and generates a rectified voltage. The switch is capable of operating in a first state in which the switch conducts power to the first power line but not the second power line, a second state in which the switch conducts power to the second power line but not the first power line, and a third state in which the switch conducts power to both the first and second power lines. The converter converts the rectified voltage to an output voltage to drive a light source, and controls a current through the light source according to a driving signal. The controller monitors the operation state of the switch and generates the driving signal based on the operation state to control the light level (e.g., the brightness or dimness) of the light source.

BRIEF DESCRIPTION OF THE DRAWINGS

Features and advantages of embodiments of the claimed subject matter will become apparent as the following detailed

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present invention provide a circuit for driving, for example, a light emitting diode (LED) light source. The circuit includes a bridge circuit that receives power from first and second power lines of a switch (e.g., a three-way switch) and generates a rectified voltage. The three-way switch is capable of operating in a first state in which the switch conducts power to the first power line but not the second power line, a second state in which the switch conducts power to the second power line but not the first power line, and a third state in which the switch conducts power to both the first and second power lines. The converter converts the rectified voltage to an output voltage to drive the light source, and controls a current through the light source according to a driving signal. Advantageously, the controller monitors the operation state of the switch and generates the driving signal based on the operation state to control a current flowing through the light source. Therefore, control of the light source (e.g., control of the light source's brightness/dimness) is achieved in response to the operation state of the switch. A traditional incandescent light bulb can thus be replaced by a more energy-efficient light source.

Figure 2A:
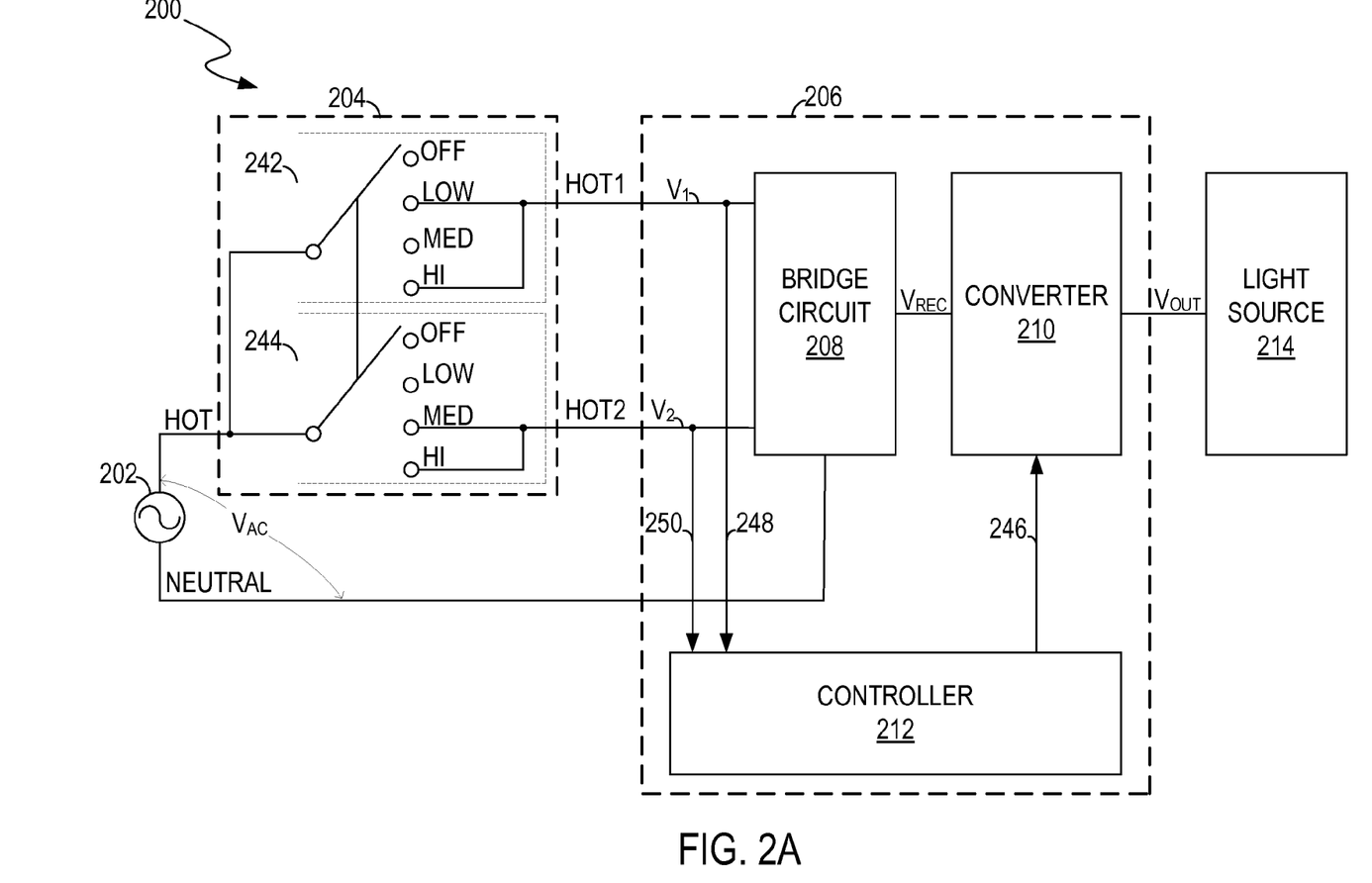
FIG. 2A illustrates a block diagram of an electronic system, in an embodiment according to the present invention.

FIG. 2A illustrates a block diagram of an electronic system 200, in an embodiment according to the present invention. The electronic system 200 includes a power source 202, a switch 204 (e.g., a three-way switch), a driving circuit 206, and a light source 214. The power source 202 generates an alternating current (AC) voltage $V_{AC}$ between the line HOT and the line NEUTRAL, e.g., $V_{AC}$ has a sinusoidal waveform. The switch 204 selectively conducts power from the line HOT to the power lines HOT1 and HOT2. The driving circuit 206 receives a power voltage $V_1$ on the line HOT1 and/or a power voltage $V_2$ on the line HOT2, and provides an output voltage $V_{OUT}$ to drive the light source 214. For illustrative purposes, the light source 214 can be a light emitting diode (LED) light source. The light source can be another type of light sources.

The switch 204 can be, for example, a push-button switch or a rotary switch mounted on a wall or a light holder. In one embodiment, the switch 204 includes two sets of electrical contacts 242 and 244. By pushing or rotating a button, the switch 204 can be switched to positions OFF, LOW, MED, and HI.

Figure 2B:
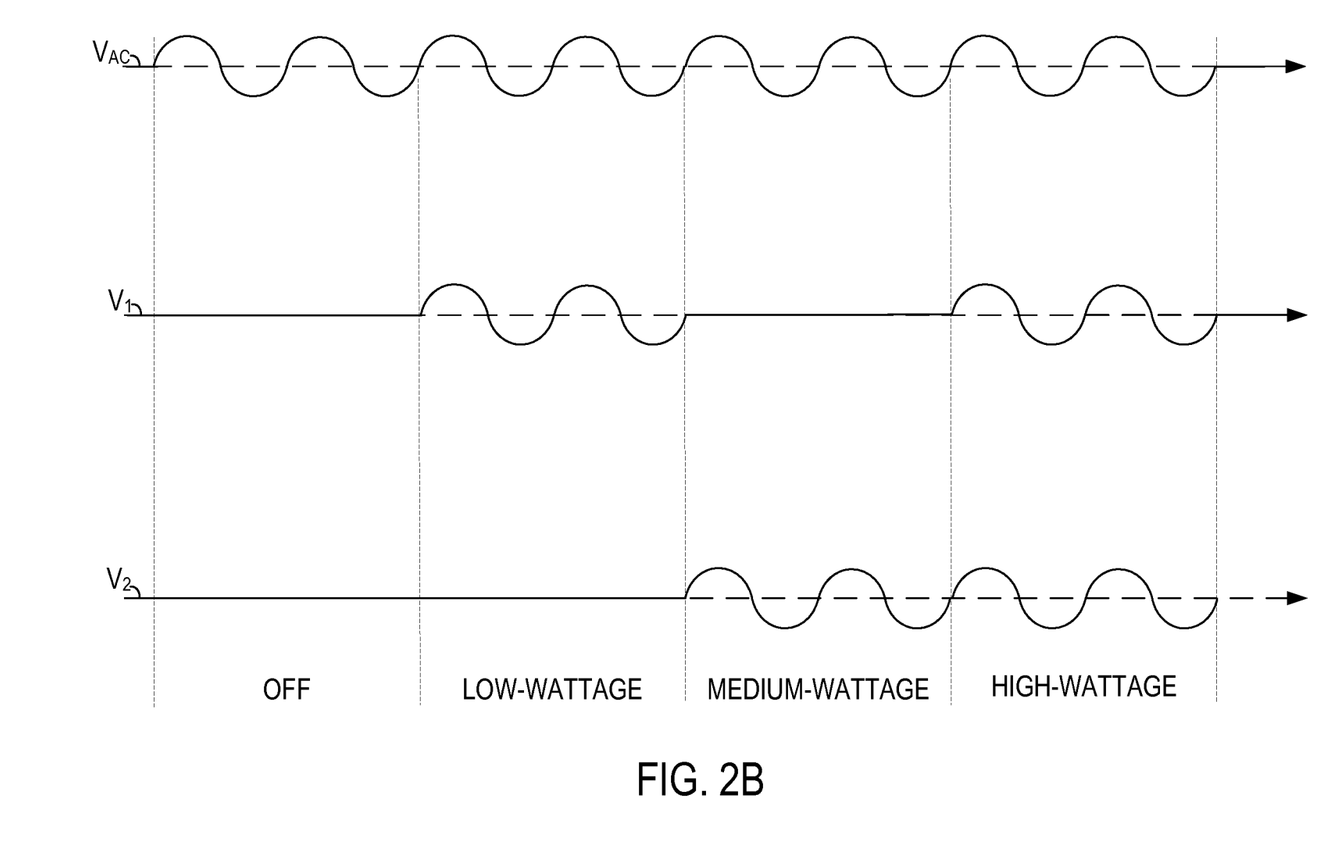
FIG. 2B illustrates waveforms of signals generated or received by a switch in an embodiment according to the present invention.

FIG. 2B illustrates waveforms of signals generated or received by the switch 204, in an embodiment according to the present invention. FIG. 2B is described in combination with FIG. 2A. FIG. 2B shows the voltage $V_{AC}$, the voltage $V_1$, and the voltage $V_2$. In the example of FIG. 2B, the voltage $V_{AC}$ has a sinusoidal waveform.

In one embodiment, the switch 204 is capable of operating in multiple operation states including an off state, a low-wattage state, a medium-wattage state, and a high-wattage state. If the switch 204 is switched to the position OFF, the switch 204 operates in the OFF state, in which both sets of the electrical contacts 242 and 244 are separated. Thus, neither the power line HOT1 nor the power line HOT2 conducts power. In this condition, both the voltage $V_1$ and the voltage $V_2$ are equal to a predetermined level $V_P$ that is equal to, e.g., the voltage on the line NEUTRAL.

If the switch 204 is switched to the position LOW, the switch 204 operates in the low-wattage state. Thus, the electrical contacts 242 are touched to conduct power to the power line HOT1. However, with the switch in the position LOW, the electrical contacts 244 are separated, and no power is conducted to the power line HOT2. In this condition, the voltage $V_1$ has a sinusoidal waveform that is similar to the waveform of $V_{AC}$ and the voltage $V_2$ is equal to the predetermined level $V_P$.

If the switch 204 is switched to the position MED, the switch 204 operates in the medium-wattage state. Thus, the electrical contacts 244 are touched to conduct power to the power line HOT2. However, with the switch in the position MED, the electrical contacts 242 are separated, and no power is conducted to the power line HOT1. In this condition, the voltage $V_2$ has a sinusoidal waveform that is similar to the waveform of $V_{AC}$ and the voltage $V_1$ is equal to the predetermined level $V_P$.

If the switch 204 is switched to the position HI, the switch 204 operates in the high-wattage state. Thus, both sets of the electrical contacts 242 and 244 are touched, and power is conducted to both the power lines HOT1 and HOT2. In this condition, both the voltage $V_1$ and the voltage $V_2$ have sinusoidal waveforms.

Refer to FIG. 2A, in one embodiment, the driving circuit 206 includes a bridge circuit 208, a converter 210, and a controller 212. The bridge circuit 208 coupled to the power lines HOT1 and HOT2 receives the power voltage $V_1$ and/or the power voltage $V_2$, and generates a rectified voltage $V_{REC}$. The converter 210 can be (without limitation) a boost converter, a buck converter, a boost-buck converter, or a flyback converter. The converter 210 converts the rectified voltage $V_{REC}$ to the output voltage $V_{OUT}$ to drive the LED light source 214. The controller 212 monitors an operation state of the switch 204, and generates a driving signal 246 accordingly. The converter 210 receives the driving signal 246 and regulates a current $I_{OUT}$ flowing through the LED light source 214 accordingly.

More specifically, in one embodiment, the controller 212 is coupled to the power lines HOT1 and HOT2, and receives a detection signal 248 indicating the power voltage $V_1$, and also receives a detection signal 250 indicating the power voltage $V_2$. Based upon the detection signals 248 and 250, the controller 212 detects in which state the switch 204 is operating. Accordingly, the controller 212 controls the driving signal 246 to adjust an average current $I_{AVG}$ through the LED light source 214, so as to control the brightness/dimness of the LED light source 214. For example, when the detection signals 248 and 250 indicate that the switch is operating in the low-wattage state, the medium-wattage state, and the high-wattage state, the controller 212 adjusts the average current $I_{AVG}$ to levels $I_1$, $I_2$ and $I_3$, respectively, where $I_1$ is less than $I_2$ which is less than $I_3$. As such, when the switch 214 is switched among the positions LOW, MED, and HI, the LED light source 214 emits light having different brightness levels.

Advantageously, by employing the driving circuit 206, the brightness/dimming control of the light source 214 is achieved in response to the operation state of the switch 204. Since, in one embodiment, the traditional incandescent light bulb is replaced by the LED light source 214, the driving circuit 206 can be more energy efficient.

Figure 3:
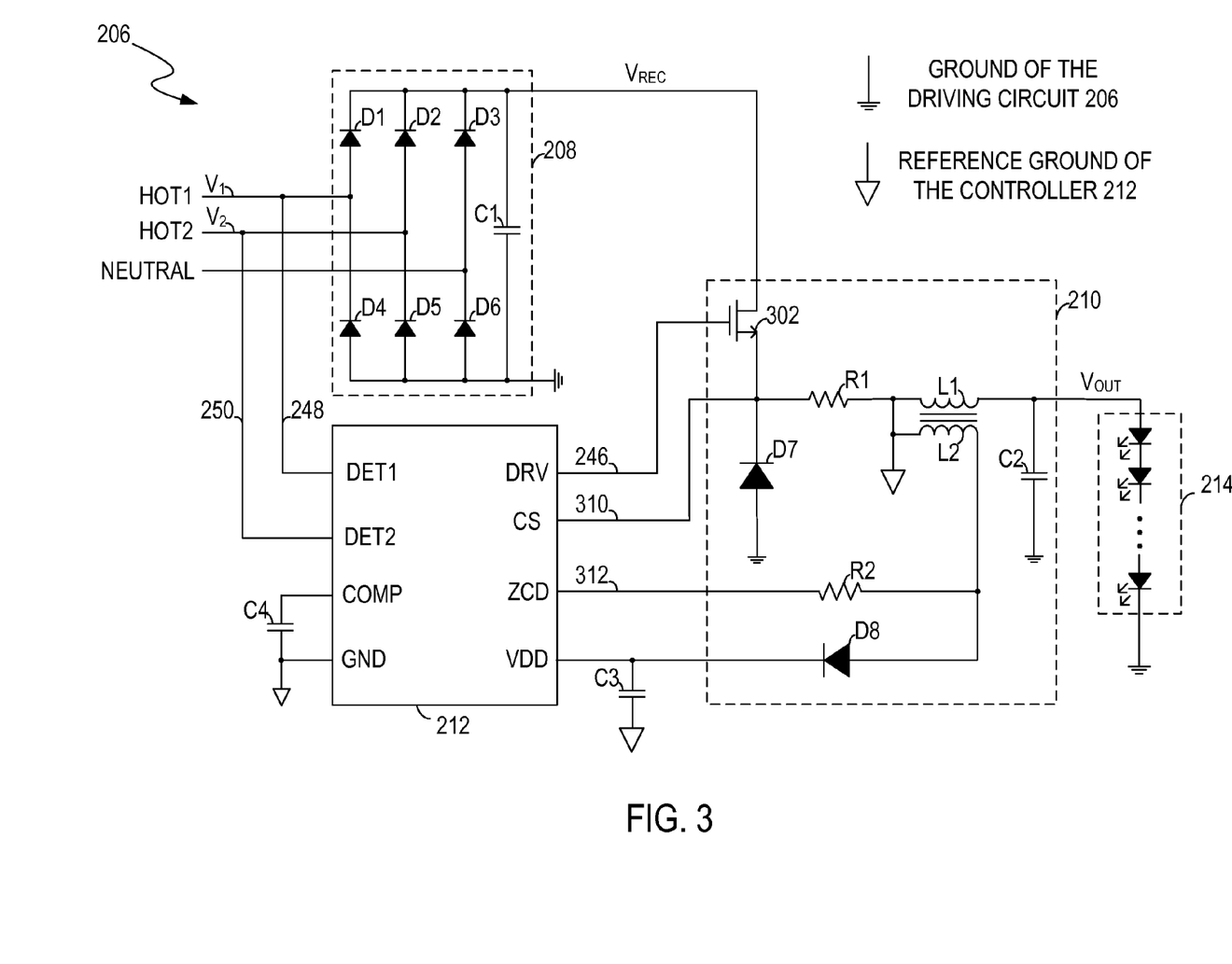
FIG. 3 illustrates a diagram of a driving circuit, in an embodiment according to the present invention.

FIG. 3 illustrates a diagram of the driving circuit 206, in an embodiment according to the present invention. Elements labeled the same as in FIG. 2A have similar functions. FIG. 3 is described in combination with FIG. 2A. The driving circuit 206 includes a bridge circuit 208, a controller 212, and a converter 210. In the example of FIG. 3, the controller 212 includes multiple pins such as a pin DET1, a pin DET2, a pin COMP, a pin GND, a pin DRV, a pin CS, a pin ZCD, and a pin VDD.

In one embodiment, the bridge circuit 208 includes multiple diode units coupled in parallel. Each of the diode units includes multiple diodes in series. As shown in FIG. 3, the bridge circuit 208 includes a first diode unit having diodes D1 and D4, a second diode unit having diodes D2 and D5, and a third diode unit having diodes D3 and D6. The bridge circuit 208 can have other configurations, and is not limited to the example in FIG. 3.

The bridge circuit 208 is operable for receiving the power voltage $V_1$ on the power line HOT1 and/or the power voltage $V_2$ on the power line HOT2, and for generating the rectified voltage $V_{REC}$. In one embodiment, when the switch 204 operates in the low-wattage state, the first diode unit and the third diode unit constitute a bridge rectifier that rectifies the power voltage $V_1$ to generate the rectified voltage $V_{REC}$. When the switch 204 operates in medium-wattage state, the second diode unit and the third diode unit constitute a bridge rectifier that rectifies the power voltage $V_2$ to generate the rectified voltage $V_{REC}$. Moreover, when the switch 204 operates in the high-wattage state, the first diode unit, the second diode unit, and the third diode unit constitute a bridge rectifier to generate the rectified voltage $V_{REC}$. Specifically, the bridge rectifier combines the voltage $V_1$ and the voltage $V_2$ to a combined voltage $V_{COM}$, and rectifies the combined voltage $V_{COM}$ to generate the rectified voltage $V_{REC}$. In one embodiment, a capacitor C1 is coupled to the diode units to smooth the waveform of the rectified voltage $V_{REC}$.

In one embodiment, the converter 210 is a buck converter including a switch 302, a diode D7, a resistor R1, an inductor L1, and a capacitor C2. The pin DRV of the controller 212 generates the driving signal 246 to control the switch 302. More specifically, in one embodiment, the driving signal 246 can be a pulse-width modulation (PWM) signal. When the driving signal 246 is logic high, the switch 302 is turned on. Then, a current $I_{L1}$ of the inductor L1 flows through the switch 302, the resistor R1, and the inductor L1. Thus, the current $I_{L1}$ increases. When the driving signal 246 is logic low, the switch 302 is turned off. Then, the current $I_{L}$ flows through the diode D7, the resistor R1, and the inductor L1. Thus, the current $I_{L}$ decreases. Therefore, an average current $I_{AVG}$ flowing through the LED light source 214 is determined by the duty cycle of the driving signal 246.

In one embodiment, the pin GND of the controller 212 is coupled to a common node between the inductor L1 and the resistor R1. In other words, a voltage on the common node provides a reference ground of the controller 212. The resistor R1 provides a sense signal 310 indicative of the current $I_{L}$ to the pin CS of the controller 212.

In one embodiment, the converter 210 further includes an inductor L2 electrically and magnetically coupled to the inductor L1. The inductor L2 provides a power voltage to the pin VDD via the diode D8 and the capacitor C3. The inductor L2 further provides a monitoring signal 312 indicating whether the current $I_{L}$ has decreased to a predetermined level, e.g., zero amperes. In one embodiment, when the current $I_{L}$ increases, the monitoring signal 312 has a first voltage level, e.g., a negative level $V_3$. When the current $I_{L}$ decreases, the monitoring signal 312 has a second voltage level, e.g., a positive level $V_4$. Once the current $I_{L}$ decreases to zero amperes, the monitoring signal 312 is switched to a third voltage level, e.g., zero volts $V_5$. As such, a falling edge of the monitoring signal 312 indicates that the current $I_{L}$ has decreased to zero amperes.

In one embodiment, the pins DET1 and DET2 are used to receive the detection signals 248 and 250. The controller 212 detects in which state the switch 204 is operating according to the detection signals 248 and 250, and further controls the driving signal 246 in response to the state. For example, the controller 212 adjusts the duty cycle of the driving signal 246 to adjust an average current through the LED light source 214. Thus, the brightness/dimming control of the LED light source 214 is achieved in response to the operation state of the switch 204. The operation of the controller 212 is further described in relation to FIG. 4-FIG. 9.

Figure 4:
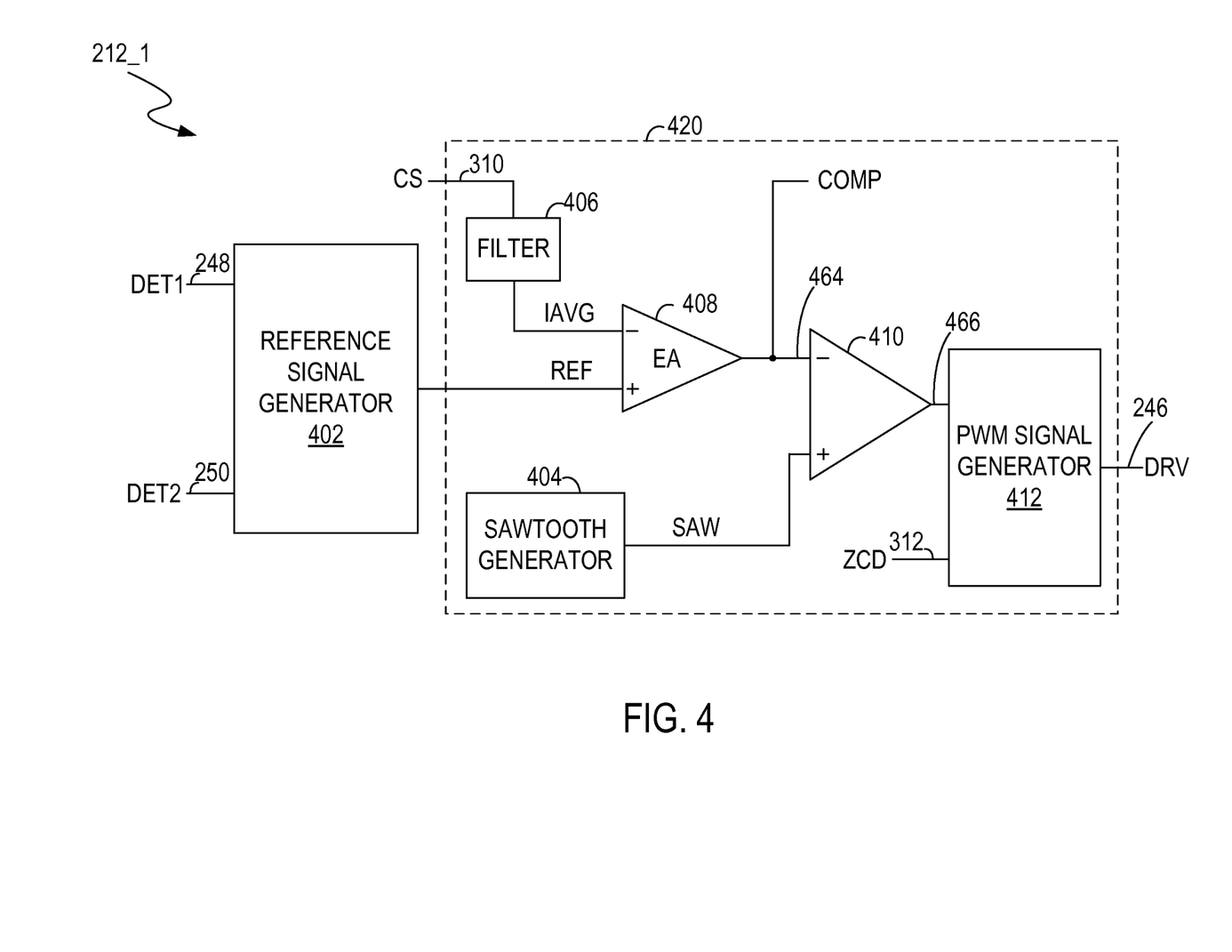
FIG. 4 illustrates a block diagram of a controller, in an embodiment according to the present invention.

FIG. 4 illustrates a block diagram of the controller 212_1, in an embodiment according to the present invention. Elements labeled the same as in FIG. 2A have similar functions. FIG. 4 is described in combination with FIG. 2A and FIG. 3. The controller 212_1 is an embodiment of the controller 212 shown in FIG. 2A and FIG. 3.

In one embodiment, the controller 212_1 includes a reference signal generator 402 and a driver 420. The reference signal generator 402 generates the reference signal REF indicating a target level $I_T$ for the average current $I_{AVG}$. The driver 420 generates the driving signal 246 according to the reference signal REF, so as to adjust the average current $I_{AVG}$ through the LED light source 214 to the target level $I_T$.

In one embodiment, the driver 420 includes a filter 406, an error amplifier 408, a comparator 410, a sawtooth generator 404, and a PWM signal generator 412. The filter 406 is coupled to the CS pin and receives the sense signal 310 indicative of the current $I_{L}$ flowing through the inductor L1, and generates an average signal IAVG indicating an average level of the current $I_{L1}$. Since the average level of the current $I_{L}$ is approximately equal to the average current $I_{AVG}$, the average signal IAVG also indicates the average current $I_{AVG}$. The error amplifier 408 generates an error signal 464 at the pin COMP based on the reference signal REF and the average signal IAVG. The sawtooth generator 404 generates a sawtooth signal SAW. The comparator 410 compares the sawtooth signal SAW with the error signal 464 to generate a comparison signal 466. The PWM signal generator 412 is coupled to the ZCD pin and generates the driving signal 246 based on the monitoring signal 312 and the comparison signal 466. In this instance, the driving signal 246 is switched to a high electrical level when the sawtooth signal SAW has increased to reach the error signal 464, and is switched to a low electrical level when the monitoring signal 312 indicates that the current $I_{L}$ has decreased to zero amperes.

The controller 212_1 controls the driving signal 246 to maintain the average current $I_{AVG}$ at the target current level $I_T$ represented by the reference signal REF. More specifically, the controller 212_1 maintains the average signal IAVG to be equal to the reference signal REF. If the signal IAVG is greater than the signal REF, which indicates that the average current $I_{AVG}$ is greater than the target level $I_T$, then the error amplifier 408 decreases the error signal 464 to decrease the duty cycle of the driving signal 246. Therefore, the average current $I_{AVG}$ is decreased. Likewise, if the signal IAVG is less than the signal REF, which indicates that the current $I_{AVG}$ is less than the target level $I_T$, the controller 212_1 increases the duty cycle of the driving signal 246 to increase the average current $I_{AVG}$.

In one embodiment, the reference signal generator 402 is coupled to the pin DET1 and the pin DET2, and receives the detection signal 248 indicating the power voltage $V_1$ and receives the detection signal 250 indicating the power voltage $V_2$. Accordingly, the reference signal generator 402 detects in which state the switch 204 operates. Advantageously, the reference signal generator 402 generates the reference signal REF according to the operation state of the switch 204. More specifically, when the switch 204 operates in the low-wattage state, the medium-wattage state, and the high-wattage state, the reference signal REF can be set to values $V_{T1}$, $V_{T2}$, and $V_{T3}$, respectively. The values $V_{T1}$, $V_{T2}$, and $V_{T3}$ indicate different target current levels $I_{T1}$, $I_{T2}$, and $I_{T3}$. Therefore, when the switch 204 operates in the low-wattage state, the medium-wattage state, and the high-wattage state, the average current $I_{AVG}$ through the LED light source 214 is adjusted to the levels $I_{T1}$, $I_{T2}$, and $I_{T3}$, respectively. In one embodiment, the current level $I_{T1}$ is less than the level $I_{T2}$, which is less than the level $I_{T3}$. The controller 212_1 can include other components and is not limited to the example of FIG. 4.

Figure 5:
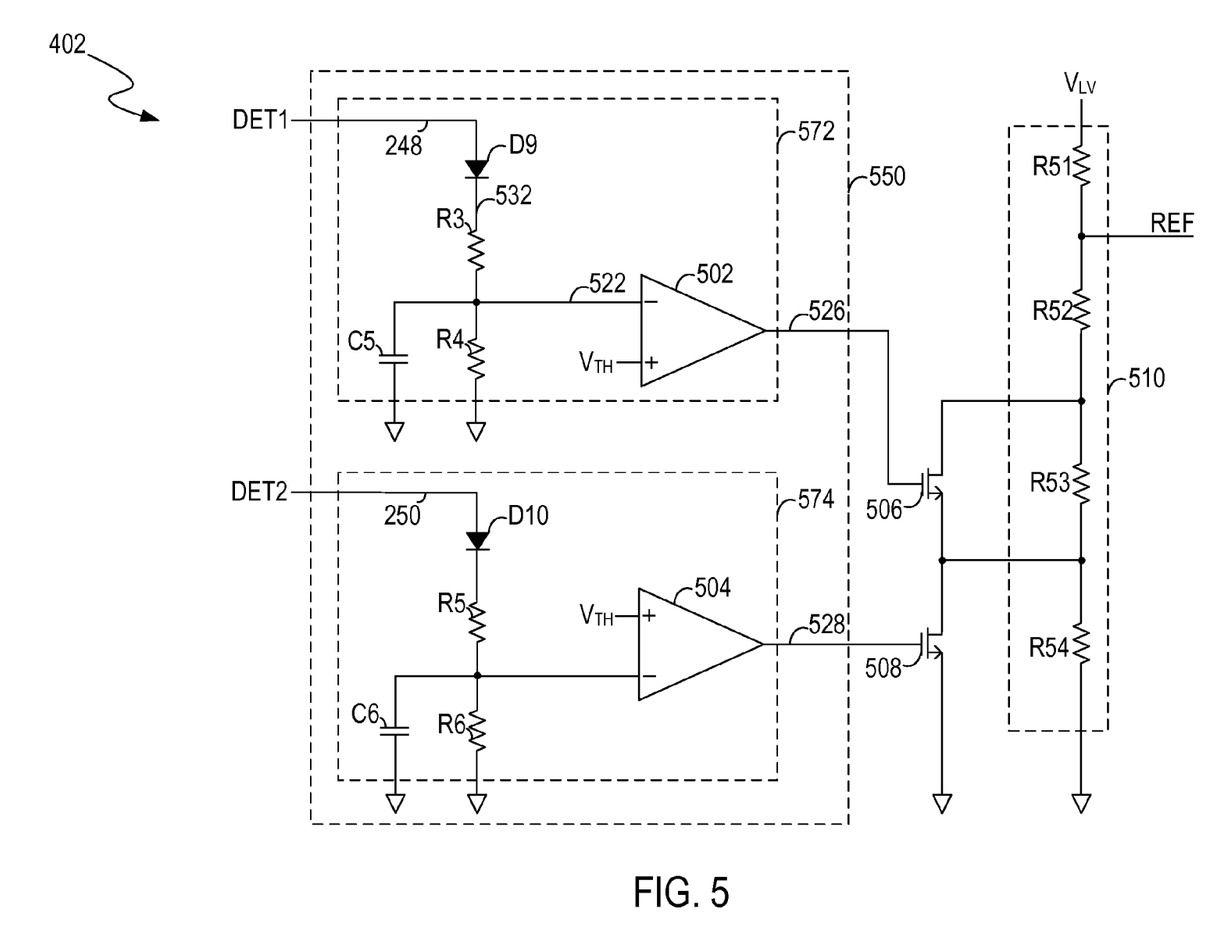
FIG. 5 illustrates an example of a diagram of a reference signal generator, in an embodiment according to the present invention.

FIG. 5 illustrates an example of a diagram of the reference signal generator 402, in an embodiment according to the present invention. FIG. 5 is described in combination with FIG. 4.

In the example of FIG. 5, the reference signal generator 402 includes a pair of switches 506 and 508, a switch controller 550, and a voltage divider 510. The voltage divider 510 includes multiple resistors R51, R52, R53, and R54, and is configured to provide the reference signal REF by dividing a voltage $V_{LV}$. In one embodiment, the voltage $V_{LV}$ can be a reference voltage generated by a reference generator, e.g., a bandgap generator. The switch 506 is coupled to the resistor R53 in parallel, and the switch 508 is coupled to the resistor R54 in parallel. The switch controller 550 selectively turns on and off the switches 506 and 508, such that one or more resistors R53 and R54 are shorted to adjust the reference signal REF to different values.

More specifically, in one embodiment, if both the switches 506 and 508 are turned on, then the resistors R53 and R54 are both shorted. In this condition, the voltage $V_{T1}$ of the reference signal REF can be given as equation (1):

$$V_{T1} = V_{DD} * R52/(R51+R52). \quad (1)$$

If the switch 508 is turned on and the switch 506 is turned off, only the resistor R54 is shorted. In this condition, the voltage $V_{T2}$ of the reference signal REF can be given as equation (2):

$$V_{T2} = V_{DD} * (R52+R53)/(R51+R52+R53). \quad (2)$$

If the switch 506 is turned on and the switch 508 is turned off, only the resistor R53 is shorted. In this condition, the voltage $V_{T3}$ of the reference signal REF can be given as equation (3):

$$V_{T3} = V_{DD} * (R52+R54)/(R51+R52+R54). \quad (3)$$

If both the switches 506 and 508 are turned off, none of the resistors R53 and R54 are shorted. Thus, the voltage $V_{T4}$ of the reference signal REF can be given as equation (4):

$$V_{T4} = V_{DD} * (R52+R53+R54)/(R51+R52+R53+R54). \quad (4)$$

The voltages $V_{T1}$, $V_{T2}$, $V_{T3}$, and $V_{T4}$ have different values. In one embodiment, the resistance of the resistors R51, R52, R53, and R54 are set to such values that $V_{T1}$ is less than $V_{T2}$, which is less than $V_{T3}$, which is less than $V_{T4}$, e.g., $V_{T1} < V_{T2} < V_{T3} < V_{T4}$.

In one embodiment, the switch controller 550 includes a detection circuit 572 and a detection circuit 574. The detection circuit 572 includes a comparator 502 having an input terminal that is coupled to the pin DET1 through components including a diode D9, resistors R3 and R4, and a capacitor C5. The comparator 502 has another input terminal that receives a voltage threshold $V_{TH}$. The detection circuit 574 includes a comparator 504 having an input terminal that is coupled to the pin DET2 through components including a diode D10, resistors R5 and R6, and a capacitor C6. The comparator 504 has another input terminal that receives a voltage threshold $V_{TH}$.

Figure 6:
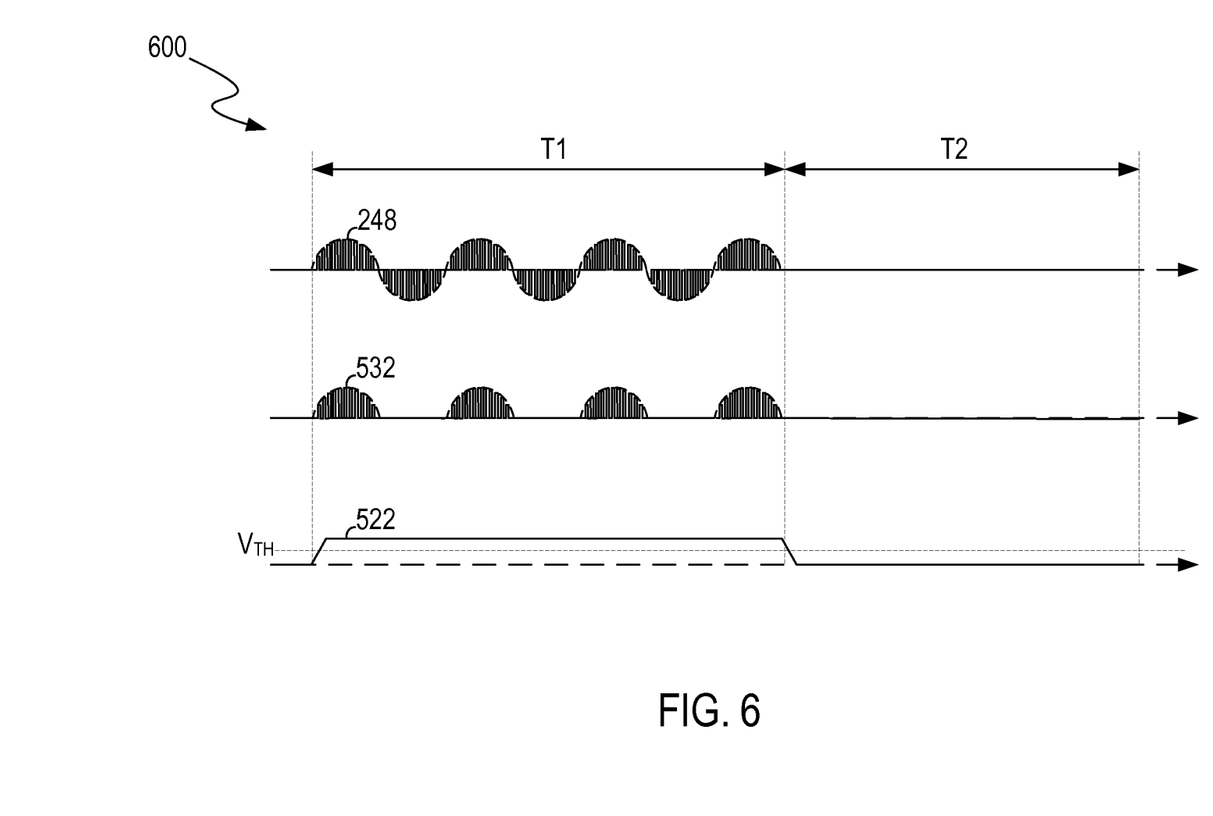
FIG. 6 illustrates an example of waveforms of signals generated by a detection circuit in one embodiment according to the present invention.

FIG. 6 illustrates an example of waveforms of signals received or generated by the detection circuit 572 according to one embodiment of the present invention. FIG. 6 is described in combination with FIG. 5. FIG. 6 shows the detection signal 248, a rectified signal 532, and a filtering signal 522.

The detection circuit 572 receives the detection signal 248 indicating the voltage $V_1$ at the line HOT1, and provides a switch-control signal 526 to control the switch 506. During a time period T1, the switch 204 is switched to the position LOW or HI to conduct power on the line HOT1. As shown in FIG. 2B, the voltage $V_1$ has a sinusoidal waveform with reference to the ground of the driving circuit 206. In one embodiment, the voltage at the ground of the controller 212 varies since the switch 302 is alternately turned on and off. Thus, as shown in FIG. 6, the detection signal 248 with reference to the ground of the controller 212 varies according to the operation of the switch 302 and the peak level of the detection signal 248 follows the voltage $V_1$. The diode D9 operates as a rectifier that provides a rectified signal 532 by allowing positive portions of the detection signal 248 and removing negative portions. The capacitor C5, the resistor R3, and the resistor R4 constitute a resistor-capacitor (RC) filter that filters high frequency components of the rectified signal 532 to generate a filtering signal 522. Thus, the filtering signal 522 has a voltage equal to an average level of the rectified signal 532. In one embodiment, the average level of the rectified signal 532 is greater than the voltage threshold $V_{TH}$.

During a time period T2, the switch 204 is switched to position OFF or MED. Thus, the power line HOT1 does not conduct power. As shown in the example of FIG. 6, the detection signal 248 drops to a predetermined voltage level which reverse-biases the diode D9. Therefore, the rectified signal 532 and the filtering signal 522 both decrease to the predetermine voltage level, e.g., $V_P$. In one embodiment, the predetermined voltage level $V_P$ is less than the voltage threshold $V_{TH}$.

The comparator 502 compares the filtering signal 522 to the voltage threshold $V_{TH}$. In one embodiment, the voltage threshold $V_{TH}$ is greater than the voltage of the filtering signal 522 during T2 and less than the voltage of the filtering signal 522 during T1. As such, the switch-control signal 526 turns on the switch 506 when the switch operates in the OFF state or in the medium-wattage state (e.g., during T2), and turns off the switch 506 when the switch operates in the low-wattage state or in the high-wattage state (e.g., during T1).

The detection circuit 574 operates similarly as the detection circuit 572. The comparator 504 generates a switch-control signal 528 that turns on the switch 508 when the switch 204 operates in the OFF state or in the low-wattage state, and turns off the switch 508 when the switch 204 operates in the medium-wattage state or in the high-wattage state.

Figure 7:
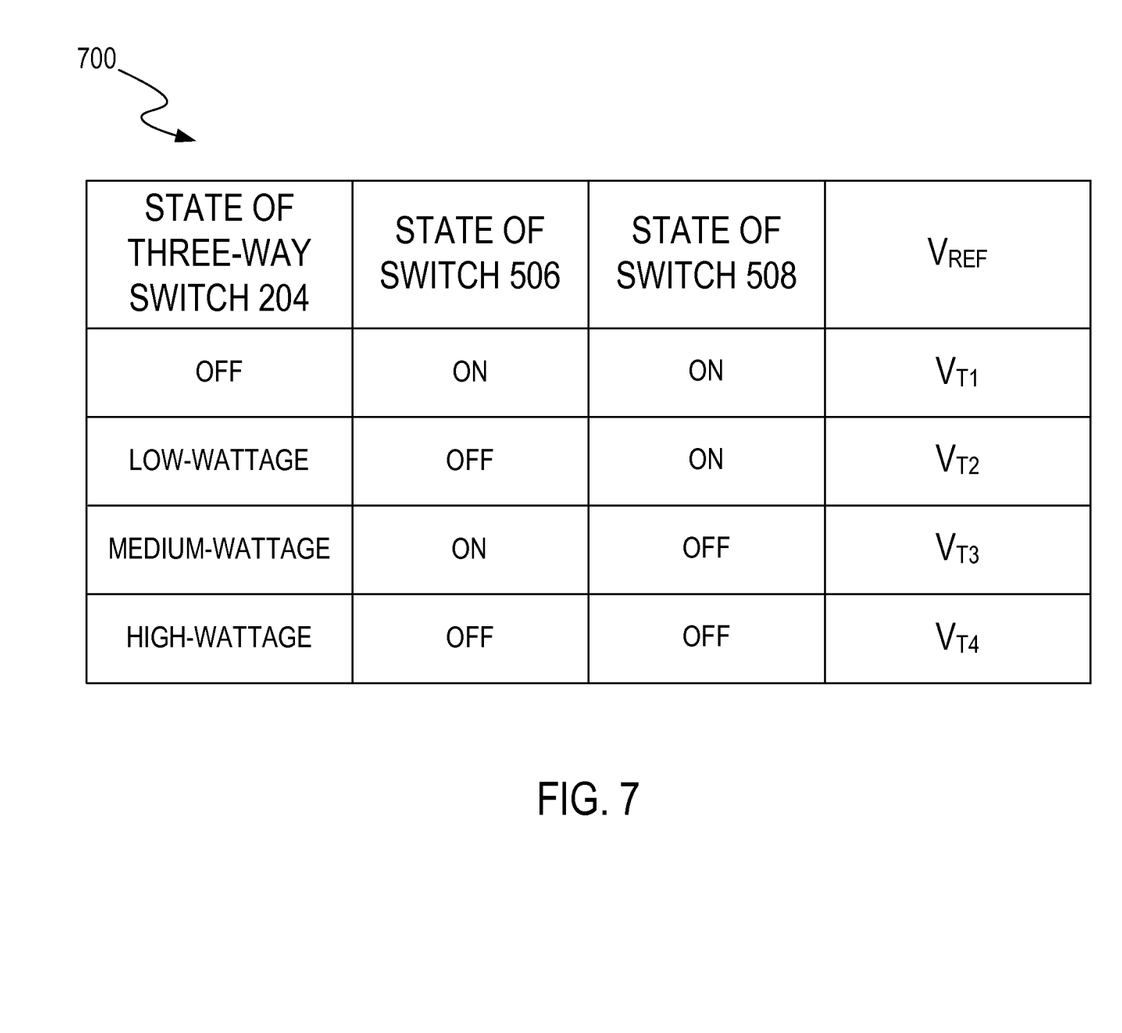
FIG. 7 illustrates a table in an embodiment according to the present invention.

FIG. 7 illustrates a table 700 in an embodiment according to the present invention. FIG. 7 is described in combination with FIG. 4 and FIG. 5.

As shown in FIG. 7, when the switch 204 operates in the OFF state, both the switches 506 and 508 are turned on. According to equation (1), the reference signal $V_{REF}$ has a value $V_{T1}$. When the switch 204 operates in the low-wattage state, the switch 506 is turned off, and the switch 508 is turned on. According to equation (2), the reference signal $V_{REF}$ has a value $V_{T2}$. When the switch 204 operates in the medium-wattage state, the switch 506 is turned on, and the switch 508 is turned off. According to equation (3), the reference signal $V_{REF}$ has a value $V_{T3}$. When the switch 204 operates in the high-wattage state, the switch 506 and the switch 508 are both turned off. According to equation (4), the reference signal $V_{REF}$ has a value $V_{T4}$.

Therefore, the reference signal $V_{REF}$ can be set to values $V_{T2}$, $V_{T3}$, and $V_{T4}$, respectively, when the switch 204 operates in the low-wattage state, the medium-wattage state, or the high-wattage state. As described in relation to FIG. 6, $V_{T2}$ is less than $V_{T3}$, which is less than $V_{T4}$. Thus, the controller 212_1 is capable of adjusting the average current $I_{AVG}$ to different levels according to the reference signal REF. For example, the average current $I_{AVG}$ can be adjusted to $I_{T1}$, $I_{T2}$, and $I_{T3}$, respectively, when the switch 204 operates in different operation states. As such, control of the light level (brightness or dimness) of the LED light source 214 is achieved in response to the operation of the switch 204.

Figure 8:
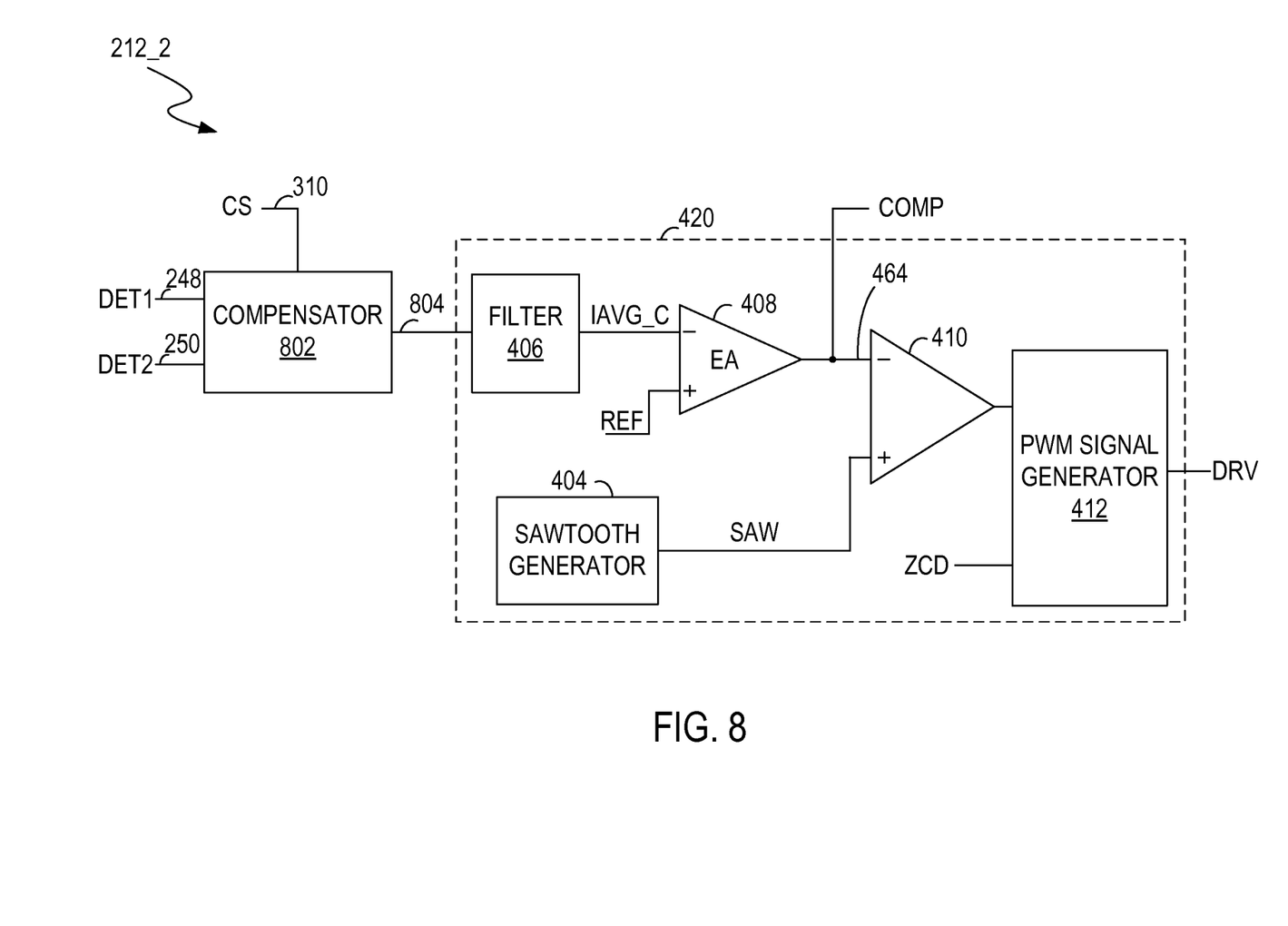
FIG. 8 illustrates a block diagram of a controller, in an embodiment according to the present invention.

FIG. 8 illustrates a block diagram of a controller 212_2, in an embodiment according to the present invention. Elements labeled the same as in FIG. 2A and FIG. 4 have similar functions. FIG. 8 is described in combination with FIG. 2A and FIG. 4. The controller 212_2 is another embodiment of the controller 212 shown in FIG. 2A and FIG. 3.

In the example of FIG. 8, the controller 212_2 includes a compensator 802 and a driver 420. The compensator 802 receives the sense signal 310 via the pin CS, receives the detection signal 248 via the pin DET1, and receives the detection signal 250 via the pin DET2. In one embodiment, the compensator 802 provides an offset signal $V_{OFFSET}$ according to the detection signal 248 and the detection signal 250, and compensates the sense signal 310 according to the offset signal $V_{OFFSET}$ to provide a compensation signal 804. In one embodiment, the voltage $V_{804}$ of the compensation signal 804 is equal to the voltage $V_{SENSE}$ of the sense signal 310 plus the offset voltage $V_{OFFSET}$ according to equation (5):

$$V_{804} = V_{SENSE} + V_{OFFSET}. \quad (5)$$

Alternatively, the voltage $V_{804}$ is equal to the voltage $V_{SENSE}$ of the sense signal 310 minus the offset voltage $V_{OFFSET}$.

In one embodiment, the driver 420 includes a filter 406, an error amplifier 408, a comparator 410, a sawtooth generator 404, and a PWM signal generator 412. The filter 406 filters the compensation signal 804 to generate an average signal IAVG_C. Similar to the driver 420 of FIG. 4, the driver 420 maintains the average signal IAVG_C to be equal to the reference signal REF, so as to adjust the average current $I_{AVG}$ through the LED light source 214 to a target level $I_T$. Therefore, an average voltage $V_{AVG\_310}$ of the sense signal 310 is determined by the offset voltage $V_{OFFSET}$ and the reference signal REF according to equation (6):

$$V_{AVG\_310} = V_{REF} - V_{OFFSET}, \quad (6)$$

where $V_{REF}$ represents a voltage of the reference signal REF.

In one embodiment, the signal REF is a substantially constant voltage generated by a signal generator. Advantageously, the compensator 802 detects in which state the switch 204 operates according to the detection signal 248 and the detection signal 250. Based on the operation state, the compensator 802 adjusts the offset voltage $V_{OFFSET}$ to different levels. For example, the compensator 802 sets the offset voltage $V_{OFFSET}$ to $V_{O1}$, $V_{O2}$, and $V_{O3}$ respectively, when the switch 204 operates in the low-wattage state, the medium-wattage state, or the high-wattage state. Therefore, according to equation (6), the average current $I_{AVG}$ flowing through the LED light source 214 can be adjusted to different levels in response to the operation state of the switch 204, so as to achieve control of the light level (brightness or dimness) for the LED light source 214.

Figure 9:
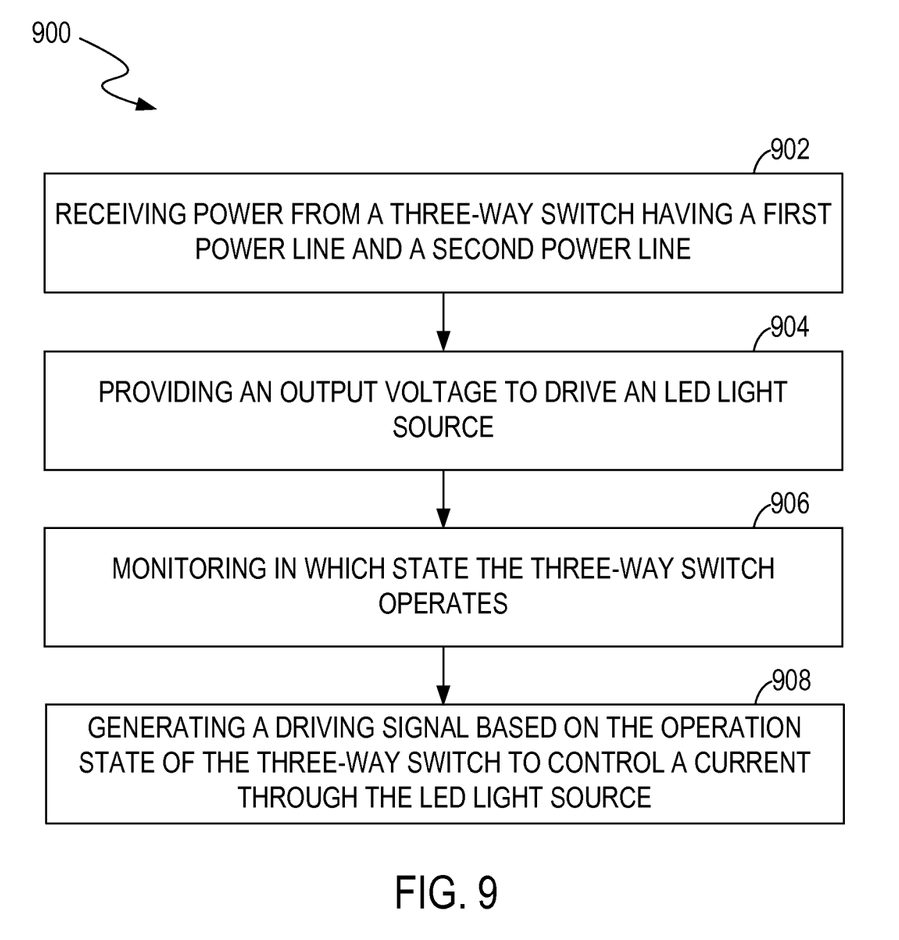
FIG. 9 illustrates a flowchart of operations performed by a circuit for driving an LED light source, in an embodiment of the present invention.

FIG. 9 illustrates a flowchart 900 of operations performed by a circuit for driving a light source (e.g., an LED light source), in an embodiment of the present invention. FIG. 9 is described in combination with FIG. 2A-FIG. 8. Although specific steps are disclosed in FIG. 9, such steps are examples. That is, the present invention is well suited to performing various other steps or variations of the steps recited in FIG. 9.

In block 902, power is received from a switch, e.g., the switch 204, having a first power line, e.g., HOT1, and a second power line, e.g., HOT2. The switch operates in multiple operation states including a first state, e.g., the low-wattage state, a second state, e.g., the medium-wattage state, and a third state, e.g., the high-wattage state. In the first state, the switch conducts power to only the first power line (that is, to the first power line but not to the second power line). In the second state, the switch conducts power to only the second power line (that is, to the second power line but not to the first power line). In the third state, the switch conducts power to both the first and second power lines.

In block 904, an output voltage, e.g., $V_{OUT}$, is provided to drive the LED light source. In one embodiment, a power voltage, e.g., $V_1$, on the first power line is rectified to generate a rectified voltage, e.g., the rectified voltage $V_{REC}$, when the switch operates in the first state. A power voltage, e.g., $V_2$, on the second power line is rectified to generate the rectified voltage when the switch operates in the second state. The power voltages on the first and second power lines are combined to a combined voltage when the switch operates in the third state. The combined voltage is rectified to generate the rectified voltage when the switch operates in the third state. The rectified voltage is converted to the output voltage to drive the light source.

In block 906, an operation state of the switch is monitored. In block 908, a driving signal is generated based on the operation state of the switch to control a current through the light source, e.g., $I_{OUT}$. In one embodiment, an average current, e.g., $I_{AVG}$, flowing through the light source is adjusted to a first level, a second level, and a third level respectively, when the switch operates in the first state, the second state, or the third state. In one embodiment, a first detection signal, e.g., the detection signal 248, indicating the power voltage on the first power line, is received. A second detection signal, e.g., the detection signal 250, indicating a power voltage on the second power line, is received. A reference signal, e.g., the reference signal REF, indicating a target level for an average current through the light source, is generated according to the first and second detection signals. The driving signal is generated according to the reference signal to adjust the average current to the target level. In one embodiment, the reference signal is set to a first value, a second value, and a third value respectively, when the first and second detection signals indicate that the switch operates in the first state, the second state, or the third state. In one embodiment, a sense signal, e.g., the sense signal 310, indicating a current through the light source, is received. An offset signal is generated according to the first and second detection signals. The sense signal is compensated based on the offset signal to generate a compensation signal, e.g., the compensation signal 804. The driving signal is generated according to the compensation signal to adjust the average current to a target level. In one embodiment, the offset signal is set to a first value, a second value, and a third value, respectively, when the first and second sense signals indicate that the switch operates in the first state, the second state, or the third state.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A circuit for driving a light source, said circuit comprising:

a bridge circuit coupled to a switch through a first power line and a second power line, and configured to receive power from said first and second power lines and generate a rectified voltage, wherein said switch operates in a plurality of operation states comprising a first state, a second state, and a third state, wherein in said first state said switch conducts power to said first power line but not said second power line, wherein in said second state said switch conducts power to said second power line but not said first power line, and wherein in said third state said switch conducts power to both said first and second power lines;

a converter coupled to said bridge circuit and configured to convert said rectified voltage to an output voltage to drive said light source, and control a current through said light source according to a driving signal; and a controller coupled to said converter and configured to monitor said operation state of said switch and generate said driving signal based on said operation state to control the light level of said light source, wherein said controller further comprises:

a signal generator configured to receive a first detection signal indicating a power voltage on said first power line, receive a second detection signal indicating a power voltage on said second power line, and generate a reference signal indicating a target level for an average current through said light source according to said first and second detection signals; and a driver coupled to said signal generator and configured to generate said driving signal according to said reference signal to adjust said average current to said target level.

2. The circuit as claimed in claim 1, wherein said bridge circuit rectifies a power voltage on said first power line to generate said rectified voltage when said three-way switch operates in said first state, and rectifies a power voltage on said second power line to generate said rectified voltage when said three-way switch operates in said second state.

3. The circuit as claimed in claim 1, wherein said bridge circuit combines power voltages on said first and second power lines to a combined voltage, and rectifies said combined voltage to generate said rectified voltage when said switch operates in said third state.

4. The circuit as claimed in claim 1, wherein said bridge circuit comprises:

a plurality of diode units coupled in parallel, each of said diode units comprising a plurality of diodes in series, wherein said diode units comprise a first diode unit, a second diode unit, and a third diode unit, wherein said first diode unit is further coupled to said first power line, and wherein further said second diode unit is coupled to said second power line.

5. The circuit as claimed in claim 4, wherein said first diode unit and said third diode unit constitute a bridge rectifier to generate said rectified voltage when said switch operates in said first state, and wherein said first diode unit, said second diode unit, and said third diode unit constitute a bridge rectifier to generate said rectified voltage when said switch operates in said third state.

6. The circuit as claimed in claim 1, wherein said signal generator sets said reference signal to a first value, a second value, and a third value, respectively, when said first and second detection signals indicate that said switch operates in said first state, said second state, and said third state, respectively.

7. A controller for controlling power to a light emitting diode (LED) light source, said controller comprising:

a pair of detection pins coupled to a three-way switch through a first power line and a second power line, and configured to detect an operation state of said three-way switch comprising a first state, a second state, and a third state, wherein in said first state said three-way switch conducts power to said first power line but not said second power line, wherein in said second state said three-way switch conducts power to said second power line but not said first power line, wherein in said third state said three-way switch conducts power to both said first power line and said second power line, wherein a power converter receives power from said three-way switch and provides an output voltage to drive said LED light source;

an output pin configured to generate a driving signal according to said operation state to control said power converter, such that an average current through said LED light source is adjusted to a first level, a second level, and a third level when said three-way switch operates in said first, second, and third operation states, respectively;

a sense pin configured to receive a sense signal indicating a current through said LED light source;

a compensator coupled to said sense in and configured to provide an offset signal according to said operation state, and compensate said sense signal based on said offset signal to generate a compensation signal; and a driver coupled to said compensator and configured to generate said driving signal according to said compensation signal to adjust said average current to a target level, wherein said offset signal is set to a first value, a second value, and a third value, respectively, when said three-way switch operates in said first state, said second state, and said third state, respectively.

8. The controller as claimed in claim 7, wherein a bridge circuit coupled between said power converter and said three-way switch provides a rectified voltage by rectifying a first power voltage on said first power line when said three-way switch operates in said first state, and by rectifying a second power voltage on said second power line when said three-way switch operates in said second state.

9. The controller as claimed in claim 8, wherein said bridge circuit combines said first power voltage and said second power voltage into a combined voltage, and rectifies said combined voltage to provide said rectified voltage when said three-way switch operates in said third state.

10. A method for driving a light emitting diode (LED) light source, said method comprising:

receiving power from a three-way switch having a first power line and a second power line, wherein said three-way switch operates in a plurality of operation states comprising a first state, a second state, and a third state, wherein in said first state said switch conducts power to said first power line but not said second power line, wherein in said second state said switch conducts power to said second power line but not said first power line, and wherein in said third state said switch conducts power to both said first and second power lines;

providing an output voltage to drive said LED light source;

monitoring in which state said three-way switch operates; and generating a driving signal based on said operation state of said three-way switch to control a current through said LED light source, wherein the step of generating a driving signal comprises:

receiving a first detection signal indicating a power voltage on said first power line;

receiving a second detection signal indicating a power voltage on said second power line;

generating a reference signal indicating a target level for an average current through said LED light source according to said first and second detection signals; and generating said driving signal according to said reference signal to adjust said average current to said target level.

11. The method as claimed in claim 10, further comprising:

rectifying a power voltage on said first power line to generate a rectified voltage when said three-way switch operates in said first state;

rectifying a power voltage on said second power line to generate said rectified voltage when said three-way switch operates in said second state;
combining said power voltages on said first and second power lines to a combined voltage when said three-way switch operates in said third state;
rectifying said combined voltage to generate said rectified voltage when said three-way switch operates in said third state; and
converting said rectified voltage to said output voltage to drive said LED light source.

12. The method as claimed in claim 10, further comprising:
setting said reference signal to a first value, a second value, and a third value, respectively, when said first and second detection signals indicate that said three-way switch operates in said first state, said second state, and said third state, respectively.

13. A circuit for driving a light source, said circuit comprising:
a bridge circuit coupled to a switch through a first power line and a second power line, and configured to receive power from said first and second power lines and generate a rectified voltage, wherein said switch operates in a plurality of operation states comprising a first state, a second state, and a third state, wherein in said first state said switch conducts power to said first power line but not said second power line, wherein in said second state said switch conducts power to said second power line but not said first power line, and wherein in said third state said switch conducts power to both said first and second power lines;
a converter coupled to said bridge circuit and configured to convert said rectified voltage to an output voltage to drive said light source, and control an average current through said light source according to a driving signal; and
a controller coupled to said converter and configured to monitor said operation state of said switch and generate said driving signal based on said operation state to control the light level of said light source,
wherein said controller comprises:
a compensator configured to receive a sense signal indicating a current through said light source, receive a first detection signal indicating the power voltage on said first power line, receive a second detection signal indicating the power voltage on said second power line, provide an offset signal according to said first and second detection signals, and compensate said sense signal based on said offset signal to generate a compensation signal; and
a driver coupled to said compensator and configured to generate said driving signal according to said compensation signal to adjust said average current to a target level.

14. The circuit as claimed in claim 13, wherein said compensator sets said offset signal to a first value, a second value, and a third value, respectively, when said first and second detection signals indicate that said switch operates in said first state, said second state, and said third state, respectively.

15. The circuit as claimed in claim 13, wherein said bridge circuit rectifies a power voltage on said first power line to generate said rectified voltage when said three-way switch operates in said first state, and rectifies a power voltage on said second power line to generate said rectified voltage when said three-way switch operates in said second state.

16. The circuit as claimed in claim 13, wherein said bridge circuit combines power voltages on said first and second power lines to a combined voltage, and rectifies said combined voltage to generate said rectified voltage when said switch operates in said third state.

17. The circuit as claimed in claim 13, wherein said bridge circuit comprises:
a plurality of diode units coupled in parallel, each of said diode units comprising a plurality of diodes in series, wherein said diode units comprise a first diode unit, a second diode unit, and a third diode unit, wherein said first diode unit is further coupled to said first power line, and wherein further said second diode unit is coupled to said second power line.

18. The circuit as claimed in claim 17, wherein said first diode unit and said third diode unit constitute a bridge rectifier to generate said rectified voltage when said switch operates in said first state, and wherein said first diode unit, said second diode unit, and said third diode unit constitute a bridge rectifier to generate said rectified voltage when said switch operates in said third state.

19. A controller for controlling power to a light emitting diode (LED) light source, said controller comprising:
a pair of detection pins coupled to a three-way switch through a first power line and a second power line, and configured to detect an operation state of said three-way switch comprising a first state, a second state, and a third state, wherein in said first state said three-way switch conducts power to said first power line but not said second power line, wherein in said second state said three-way switch conducts power to said second power line but not said first power line, wherein in said third state said three-way switch conducts power to both said first power line and said second power line, wherein a power converter receives power from said three-way switch and provides an output voltage to drive said LED light source;
an output pin configured to generate a driving signal according to said operation state to control said power converter, such that an average current through said LED light source is adjusted to a first level, a second level, and a third level when said three-way switch operates in said first, second, and third operation states, respectively;
a signal generator configured to receive a first detection signal indicating a power voltage on said first power line, receive a second detection signal indicating a power voltage on said second power line, and generate a reference signal indicating a target level for said average current through said light source according to said first and second detection signals; and
a driver coupled to said signal generator and configured to generate said driving signal according to said reference signal to adjust said average current to said target level,
wherein said reference signal has a first value, a second value, and a third value, respectively, when said three-way switch operates in said first state, said second state, and said third state, respectively.

20. The controller as claimed in claim 19, wherein a bridge circuit coupled between said power converter and said three-way switch provides a rectified voltage by rectifying a first power voltage on said first power line when said three-way switch operates in said first state, and by rectifying a second power voltage on said second power line when said three-way switch operates in said second state.

21. The controller as claimed in claim 20, wherein said bridge circuit combines said first power voltage and said second power voltage into a combined voltage, and rectifies said combined voltage to provide said rectified voltage when said three-way switch operates in said third state.

22. A method for driving a light emitting diode (LED) light source, said method comprising:
- receiving power from a three-way switch having a first power line and a second power line, wherein said three-way switch operates in a plurality of operation states comprising a first state, a second state, and a third state, wherein in said first state said switch conducts power to said first power line but not said second power line, wherein in said second state said switch conducts power to said second power line but not said first power line, and wherein in said third state said switch conducts power to both said first and second power lines;
- providing an output voltage to drive said LED light source;
- monitoring in which state said three-way switch operates; and
- generating a driving signal based on said operation state of said three-way switch to control a current through said LED light source,
- wherein the step of generating the driving signal comprises:
- receiving a sense signal indicating a current through said LED light source;
- receiving a first detection signal indicating the power voltage on said first power line;
- receiving a second detection signal indicating the power voltage on said second power line;
- providing an offset signal according to said first and second detection signals;
- compensating said sense signal based on said offset signal to generate a compensation signal; and
- generating said driving signal according to said compensation signal to adjust said average current to a target level.

23. The method as claimed in claim 22, further comprising:
- setting said offset signal to a first value, a second value, and a third value, respectively, when said first and second detection signals indicate that said three-way switch operates in said first state, said second state, and said third state, respectively.

24. The method as claimed in claim 22, further comprising:
- rectifying a power voltage on said first power line to generate a rectified voltage when said three-way switch operates in said first state;
- rectifying a power voltage on said second power line to generate said rectified voltage when said three-way switch operates in said second state;
- combining said power voltages on said first and second power lines to a combined voltage when said three-way switch operates in said third state;
- rectifying said combined voltage to generate said rectified voltage when said three-way switch operates in said third state; and
- converting said rectified voltage to said output voltage to drive said LED light source.

* * * * *